United States Patent
Edwards et al.

(10) Patent No.: US 6,353,819 B1
(45) Date of Patent: Mar. 5, 2002

(54) METHOD AND SYSTEM FOR USING DYNAMICALLY GENERATED CODE TO PERFORM RECORD MANAGEMENT LAYER FUNCTIONS IN A RELATIONAL DATABASE MANAGER

(75) Inventors: David S. Edwards; David A. Egolf, both of Glendale; William L. Lawrance, Phoenix, all of AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/408,985

(22) Filed: Sep. 29, 1999

(51) Int. Cl.⁷ .............................................. G06F 17/30
(52) U.S. Cl. .................. 707/2; 707/2; 707/4; 707/10; 707/101; 709/215; 711/100; 711/216; 714/11
(58) Field of Search ................. 707/1, 2, 3, 4, 707/10, 101, 102, 104.1, 206, 103 R; 709/201, 215; 711/4, 100, 112, 171, 150, 202, 216, 221; 714/11; 705/35

(56) References Cited

U.S. PATENT DOCUMENTS

| | | | | |
|---|---|---|---|---|
| 5,283,894 A | * | 2/1994 | Deran ............................ | 707/1 |
| 5,408,652 A | * | 4/1995 | Hayashi et al. ................ | 707/1 |
| 5,544,355 A | * | 8/1996 | Chaudhuri et al. ............ | 707/2 |
| 5,555,388 A | * | 9/1996 | Shaughnessy ................ | 711/100 |
| 5,659,727 A | * | 8/1997 | Velissaropoulos et al. ..... | 707/2 |
| 5,706,495 A | * | 1/1998 | Chadha et al. ................. | 707/2 |
| 5,717,919 A | * | 2/1998 | Kodavalla et al. ............. | 707/8 |
| 5,724,569 A | * | 3/1998 | Andres ........................... | 707/2 |
| 5,794,228 A | * | 8/1998 | French et al. .................. | 707/2 |
| 5,794,229 A | * | 8/1998 | French et al. .................. | 707/2 |
| 5,812,996 A | * | 9/1998 | Rubin et al. .................... | 707/2 |
| 5,822,749 A | * | 10/1998 | Agarwal ......................... | 707/2 |
| 5,873,099 A | * | 2/1999 | Hogan et al. ................. | 707/204 |
| 5,918,255 A | * | 6/1999 | White et al. .................... | 707/3 |
| 5,956,706 A | * | 9/1999 | Carey et al. .................... | 707/2 |
| 6,073,129 A | * | 6/2000 | Levine et al. .................. | 707/4 |
| 6,115,703 A | * | 9/2000 | Bireley et al. ................. | 707/2 |
| 6,175,835 B1 | * | 1/2001 | Shadmon ..................... | 707/102 |
| 6,192,370 B1 | * | 2/2001 | Primsch .................. | 707/103 R |
| 6,202,070 B1 | * | 3/2001 | Nguyen et al. ........... | 707/104.1 |
| 6,233,569 B1 | * | 5/2001 | Lehtinen ....................... | 706/10 |
| 6,240,422 B1 | * | 5/2001 | Atkins et al. ................ | 707/102 |
| 6,240,428 B1 | * | 5/2001 | Yeung et al. ................ | 707/206 |
| 6,289,334 B1 | * | 9/2001 | Reiner et al. ................... | 707/3 |

OTHER PUBLICATIONS

Database Products INTEREL Reference Manual INTEREL Performance Guidelines GCOS 8, Copyright Bull HN Information Systems Inc. 1996, Order No. LZ93 REV01B.

(List continued on next page.)

*Primary Examiner*—Hosain T. Alam
*Assistant Examiner*—Shahid Alam
(74) *Attorney, Agent, or Firm*—Faith F. Driscoll; John S. Solakian

(57) ABSTRACT

A system and method that enhances the row retrieval performance of a multi-layer relational database manager by including in the code generation component layer of the database manager a row retrieval performance enhancing subroutine designed to execute functions performed by a lower component layer substantially faster than if the functions were executed by such lower component layer. The subroutine includes logic for establishing the conditions under which the particular subroutine is invoked during the execution of a SQL request. The output code generated to execute a specific SQL query, including calls to the row retrieval subroutine in place of normally included calls to the lower component layer. This enables the generated code to perform lower component layer functions with specialized code designed to increase performance based on the characteristics of the data being retrieved.

15 Claims, 6 Drawing Sheets

OTHER PUBLICATIONS

Choy, David et al., "A Distributed Catalog for Heterogeneous Distributed Database Resources", Proceedings of the First International Conference on Parallel and Distributed Information Systems, Dec. 4–6, 1991, IEEE, pp. 236–244.*

More, Sachin et al., "Extended Collective I/O for Efficient Retrieval of Large Objects", HIPC '98, 5th International Conference on High Performance Computing, Dec. 17–20, 1998, pp. 359–366.*

* cited by examiner

METHOD AND SYSTEM FOR USING DYNAMICALLY GENERATED CODE TO PERFORM RECORD MANAGEMENT LAYER FUNCTIONS IN A RELATIONAL DATABASE MANAGER

RELATED PATENT APPLICATIONS

1. A Method and System For Dynamically Generating Code to Enhance the Performance of a Relational Database Manager That Provides Access to a Relational Database invented by David S. Edwards, David A. Egolf and William L. Lawrance and filed on even date, bearing Ser. No. 09/408,767 and assigned to the same assignee as named herein.
2. A Method and System For Using Dynamically Generated Code to Perform Index Record Retrieval in Certain Circumstances in a Relational Database Manager invented by David S. Edwards and Todd Kneisel, filed on even date, bearing Ser. No. 09/408,986 and assigned to the same assignee as named herein.

BACKGROUND OF THE INVENTION

1. Field of Use

The present invention relates to data processing systems and more particularly to database management systems.

2. Prior Art

Typically, today's enterprise or legacy systems store large quantities of data in database systems accessed by database management system (DBMS) software. In such database systems, data is logically organized into relations or tables wherein each relation can be viewed as a table where each row is a tuple and each column is a component of the relation designating an attribute. It has become quite common to use relational database management systems (RDMS) for enabling users to enter queries derived from a database query language, such as SQL, into the database in order to obtain or extract requested data.

In compiling type database management systems, an application program containing database queries is processed for compilation prior to run time. This can be done and more frequently is done at run time by users of the INTEREL product discussed herein. Users of other database products such as DB2, do such processing prior to run time.

During compilation, database queries are passed to the database management system for compilation by a database management system compiler. The compiler translates the queries contained in the application program into machine language. Generally, a database compiler component referred to, as a query optimizer is included in the database management system to select the manner in which queries will be processed. The reason is because most users do not input queries in formats that suggest the most efficient way for the database management system to address the query. The query optimizer component analyzes how best to conduct the user's query of the database in terms of optimum speed in accessing the requested data. That is, the optimizer typically transforms a user query into an equivalent query that can be computed more efficiently. This operation is performed at compile time, in advance of execution.

A major component of the RDBMS is the database services component or module that supports the functions of SQL language, such as definition, access control, retrieval and update of user and system data. Such components may utilize a multilayer structure containing submodules or components for carrying out the required functions. For example, one such system includes a series of components or conceptually, a series of layers for carrying out the required functions for accessing data from the relational database. More specifically, a first layer functions as a SQL director component that handles requests at the interface to the requesting or calling application program. A second layer consists of two major components, an optimizer for optimizing the query and a RAM code generation component. The optimizer processes the query and determines the appropriate access plan strategy. The code generation component generates code according to such plan for accessing and processing the requested data. The access plan defines the type of access to each table, order of access, whether any sorts or joins are performed along with other related information.

The generated code is passed to a third layer that functions as a relational file manager (RFM) component. This component layer performs the relational file processing function of translating the code-generated requests into IO file read/write requests. A fourth layer that functions as an IO Controller performs the requested I/O operation designated by such IO file requests that results in reading/writing the relational database files in page increments. The described architecture is characteristic of the INTEREL product developed and marketed by Bull HN Information Systems Inc. For information concerning this product, reference may be made to the publication entitled, "Database Products INTEREL Reference Manual INTEREL Performance Guidelines, Copyright, 1996 by Bull HN Information Systems Inc., Order No. LZ93 Rev01B.

It has been found that while the above architecture provides design advantages, it tends to slow down relational data access performance. More specifically, the relational retrieval process involves the execution of functions by a series of components or layers that can result in decreased performance. This is the case particularly when the RDMS is required to access non-partitioned (i.e., single page) data rows.

Accordingly, it is a primary object of the present invention to provide a more efficient method and system for improving relational data access performance in retrieving row data.

SUMMARY OF THE INVENTION

The above objects are achieved in a preferred embodiment of the present invention that can be utilized in a relational database management System (RDMS) that implements the Structured Query Language (SQL) standard. The present invention is a system and method that enhances the data access performance of a multi-layered relational database manager in performing row retrieval operations.

The data manager of the preferred embodiment includes several layers; a lower layer of the several layers is a relational file manager (RFM) component layer normally used to perform relational file processing operations, such as the fetching of unpartitioned rows. Since such processing is carried out through a succession of layers, this results in slowing down the row retrieval process. The invention makes it possible to logically remove the RFM component layer from the row retrieval process for most retrieval operations.

According to the teachings of the invention, a higher layer of the data manager that corresponds to the code generation component layer includes specific code that is customized at code generation time for the specific data to be retrieved. The specific code includes a number of calls to a particular performance enhancing subroutine stored in the component's extended library. The performance enhancing subroutine is designed to execute record management functions performed by lower component layers substantially faster than if such lower component layers executed such functions.

The subroutine includes logic for establishing the conditions under which the particular subroutine is invoked as a function of the characteristics of the particular data record being accessed during the execution of the query. For example, in the preferred embodiment, when the generated SQL query code is being executed and accesses the predetermined type of data file record that corresponds to a non-partitioned row, the code generating component layer executes the performance enhanced subroutine in lieu of having the lower RFM component layer perform the required record file processing. Bypassing or eliminating this layer from the row retrieval process results in a substantial increase in performance.

The above objects and advantages of the present invention will be better understood from the following description when taken in conjunction with the accompanying drawings.

DESCRIPTION OF THE PREFERRED EMBODIMENT

FIG. 1

Figure 1:
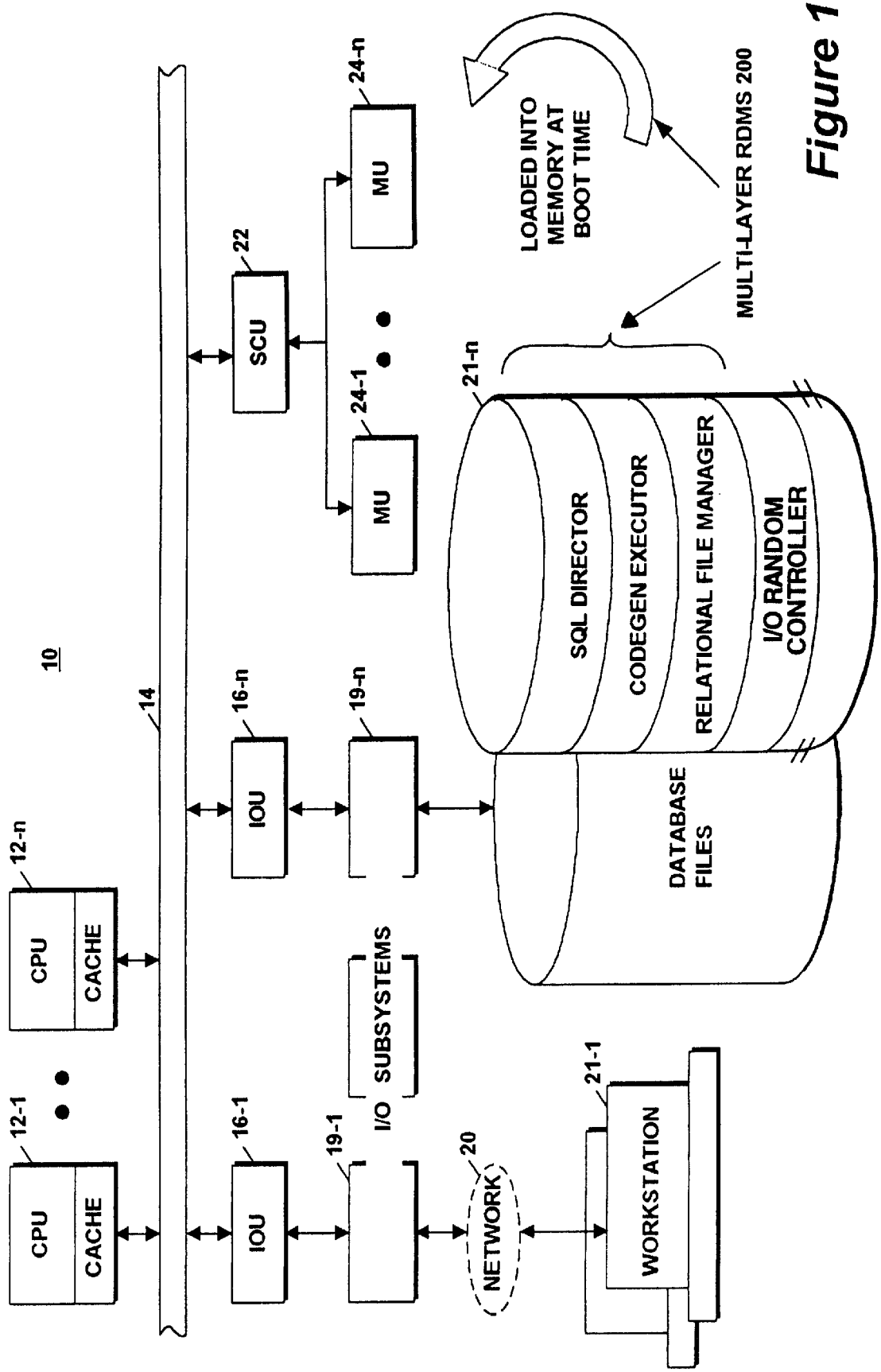
FIG. 1 is an overall block diagram of a data processing system that utilizes the teachings of the present invention.

FIG. 1 is a block diagram of a conventional data processing system 10 that utilizes the system and method of the present invention. As shown, the system 10 includes a plurality of processing units 12-1 through 12-n which connect to a system bus 14 through their individual physical caches in common with a number of input/output units (IOUs) 16-1 through 16-n and a system control unit (SCU) 22. As shown, each IOU couples to a particular I/O subsystem (i.e., 19-1 through 19-n) which in turn connect to any one of a number of different types of devices both local and remote such as workstation 21-1 via a network 20 or disk storage 21-n as indicated.

The SCU 22 connects to a number of memory units (MUs) 24-1 through 24-n. For the purpose of the present invention, system 10 may be considered convention in design and may for example utilize a mainframe computer system such as the DPS9000 manufactured by Bull HN Information Systems Inc. which operates under the control of the GCOS8 operating system.

As shown, the disk storage 21-n contains the database system that utilizes the teachings of the present invention. It will be appreciated that the software components that comprise the database system including the software components of the present invention may be loaded into the system 10 in a conventional manner (e.g. via CDROM, disk, communications link, etc.). The database system includes a multi-layer relational database management system (RDMS) and a relational database containing established data files. The relational database management system processes all user requests for accessing the files contained on disk storage 21-n. Users initiate such requests via the network 20 by executing transaction processing routines or batch decision support programs via their workstation keyboard and/or via other input devices (e.g. mouse). The system 10 upon receiving an SQL query operates to initiate a search of the relational database files to obtain the data requested by the user.

In system 10, the relational database management system (RDMS) takes the form of the above mentioned INTEREL software which runs under the GCOS8 operating system. As shown, the RDMS contains a SQL Director component layer, a Codegen Executor component layer, a Record File Manager (RFM) component layer and an IO Random Controller component layer. These component layers are shown in greater detail, in FIG. 2 along with other database related components.

Figure 2:
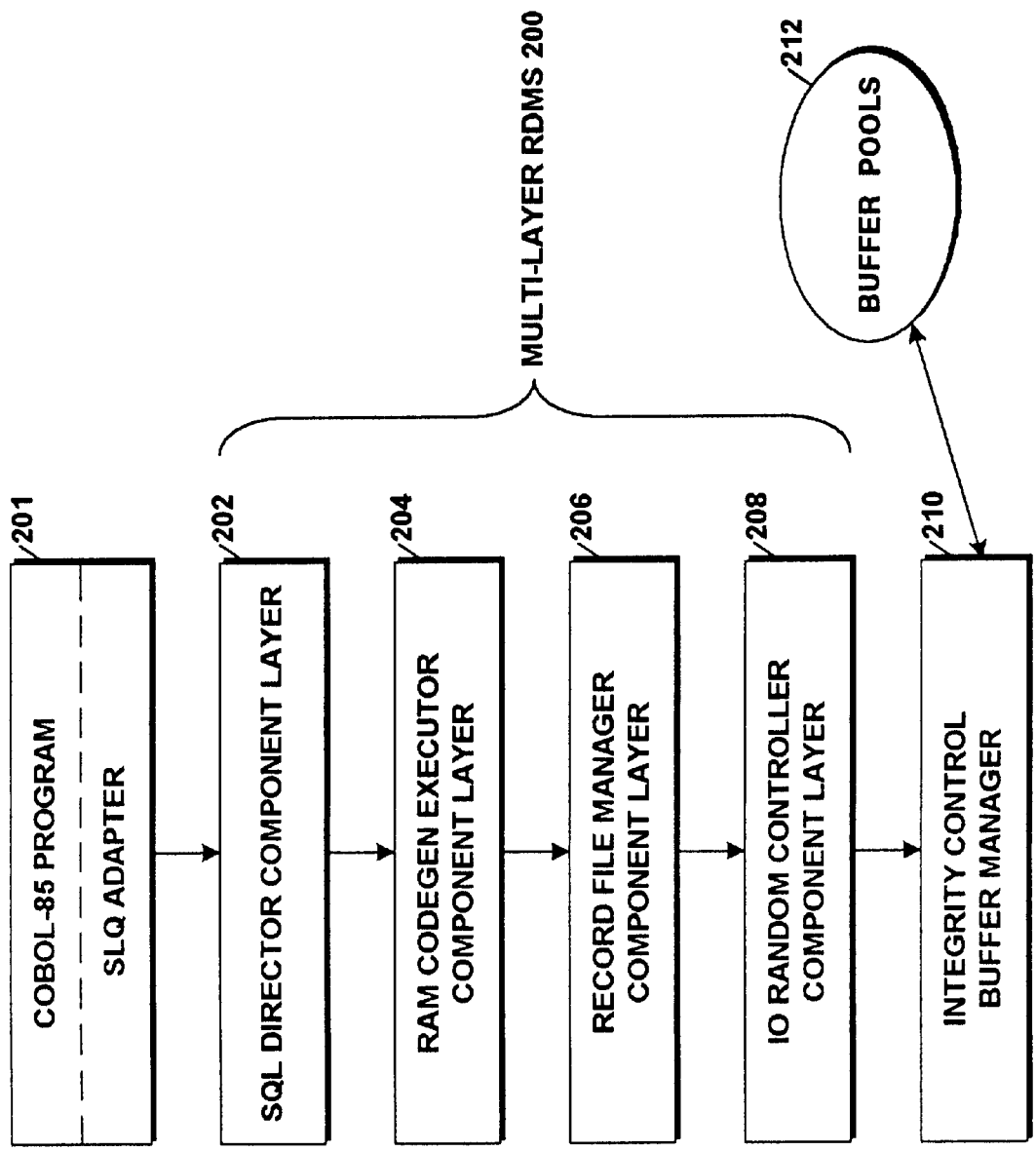
FIG. 2 is a block diagram illustrating the conventional multi-layer organization of the relational database manager system (RDMS) of FIG. 1.

FIG. 2—Multi-layer RDMS Organization

FIG. 2 depicts the major components of the RDMS that utilizes the teachings of the present invention. As shown, these components include the four component layers of RDMS 200 (INTEREL software) discussed above. During normal operation, the different software components of RDMS 200 including the present invention are loaded from disk storage 21-n into memory (e.g. MU 24-1) in a conventional manner.

In greater detail, SQL Director Component layer 202 operatively couples to an SQL adapter 201 that serves as the application's interface to the RDMS 200. The SQL Adapter 201 includes a runtime library that contains runtime routines bound into the application used by an application such as a COBOL-85 program for issuing calls. Each such call results in library sending a query statement to the SQL Director component layer 202.

The SQL Director component layer 202 handles the interface processing between RDMS 200 and a calling program. Thus, it manages the database connection. Layer 202 contains routines which analyze each query statement for determining if the statement is of a type that accesses relational database files and thus is suitable for code generation and caching. Each process utilizes a "local cache" for such storage. The use of "local caches" is discussed in the above referenced INTEREL Reference manual. Additionally, reference may be made to the copending patent application of Donald P. Levine and David A. Egolf, entitled: A Method and Apparatus for Improving the Performance of a Database Management System Through a Central Cache Mechanism, bearing Ser. No. 08/999,248 filed on Dec. 29, 1997 which is assigned to the same assignee as named herein.

As indicated, the SQL Director component layer 202 operatively couples to the RAM Codegen Executor Component layer 204. The SQL Director component layer 202 also contains routines that generate calls to a cache manager component to see if the code for that statement can be found in the process's local cache. When code for that statement is not found in the local cache, the SQL Director component layer 202 calls the RAM Codegen Executor Component layer 204 to process and "potentially" execute the query statement.

The RAM Codegen Executor layer 204 processes the SQL query. If the code has been generated for a particular query, layer 204 executes such code. When code has not been generated for a particular query, layer 204 optimizes the SQL query, generates code according to the optimized access plan and processes the requested data. The generated code is stored in "local cache" and executed.

As shown, the RAM Codegen Executor Component layer 204 operatively couples to the Record File Manager component layer 206. During execution, the generated code calls various RFM functions to read or write relational data and/or index information from RFM files. Hence, this layer does not deal with the physical storage of data in a file.

The RFM component layer 206 performs the relational processing for RDMS 200 and contains all of the knowledge of the physical layout of the data on the file pages or Control Intervals (CIs). It receives the read and write requests from layer 204 and then translates them into IO file read and write requests respectively. It processes the file pages read by layer 208 to which it operatively couples. Thus, this layer hides the physical storage of data and all other file format details from layer 204.

The IO Random Controller component layer 208 receives the requests from layer 206 and performs the relational file processing of translating the code-generated requests into I/O read/write requests. It processes the database files in page increments (CI). It is oblivious to physical storage of the data on the page. These details are handled by the other components illustrated in FIG. 2. That is, layer 208 operatively couples to Buffer pools 212 via an Integrity Control Buffer Manager component 210. As known in the art, buffer pools contain buffers having a specific page size (control interval (CI)). These buffers are used by the RDMS files. This arrangement is discussed in the above-mentioned INTEREL reference manual.

Figure 3A:
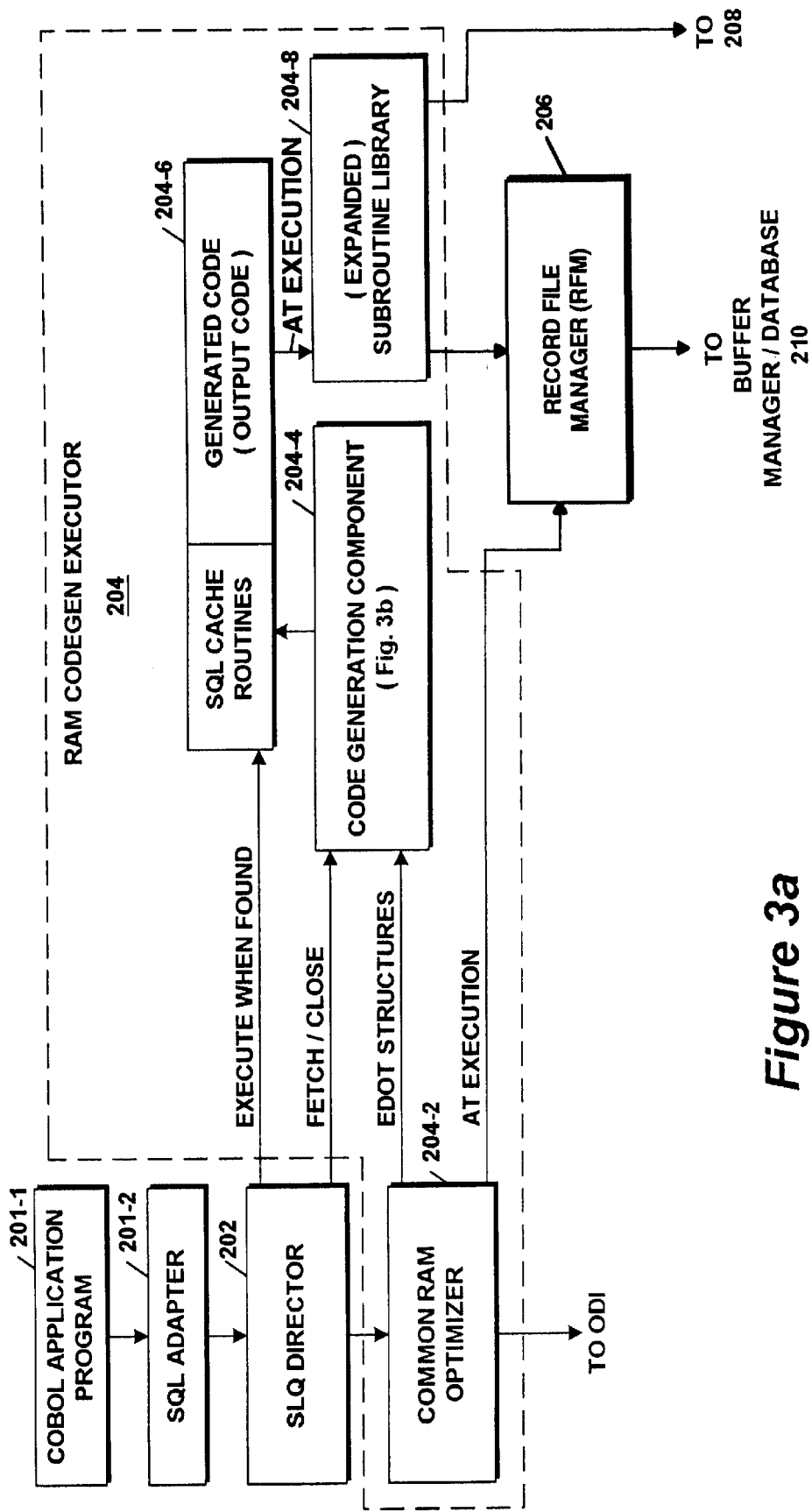
FIG. 3a is a block diagram illustrating in greater detail, the major components of the second layer of the RDMS of FIG. 2 according to the present invention.

RAM Codegen Executor Layer 204—FIG. 3a

This figure illustrates in greater detail, the components that make up layer 204 according to the teachings of the present invention. As indicated, the layer 204 includes a common RAM Optimizer component 204-2, a code generation component 204-4, an SQL cache memory component 204-6 for storing SQL cache routines and generated code and an expanded subroutine library component 204-8. These components are operatively coupled as shown.

As discussed above, optimizer component 204-2 processes the SQL query by determining the appropriate access plan strategy. As a result of such processing, component 204-2 generates a set of EDOT control structures that define the operation (SQL query) to execute (e.g. SELECT, UPDATE, INSERT or DELETE), the data to process (e.g. columns), the access method to use (e.g. scan or index or hash) and the restrictions that apply versus the access method to limit the amount of data (or rows) to process. Also, the structures define where the data obtained for the query is to be returned to a user. The path to ODI is used only during EDOT generation for verifying the query for correctness (e.g. does a specified column belong to a specified table). As indicated, the EDOT structures are applied as inputs to Code generation component 204-4. This component generates the required code that is stored in cache storage 204-6.

The cache storage 204-6 operatively couples to a subroutine library 204-8. Library 204-8 contains subroutines for communicating with RFM component layer 206. In this case, library 204-8 operatively couples to component layer 208 as indicated in FIG. 3a.

In accordance with the teachings of the present invention, library 204-8 also includes a row retrieval performance enhancing subroutine that allow the bypassing of the RFM layer 206 as discussed herein. The row retrieval subroutine in accordance with the present invention includes instructions that are used to process the fields of a data row more efficiently. The DPS9000 system of the preferred embodiment supports a Complex Instruction Set (CIS) that includes instructions for operating on character or bit strings. These instructions are used by the language in which RFM component layer is written because the data rows with their record header are of varying length and are not word or half word aligned (i.e., left justified). The drawback to using string and bit oriented instructions is that they are slow in comparison to word oriented instructions (typically 10 times slower). Word and half word oriented instructions are called basic-op instructions and usually take 1 T (i.e., one clock cycle) to execute.

The problem with word oriented basic-op instructions is that they require that the data to be accessed be word aligned. This problem is overcome in the new row retrieval enhancing subroutine which uses a string move instruction to move the row header to a word aligned buffer where it can be analyzed with word oriented instructions. Once this information has been word aligned, it is used by the new subroutine to determine whether the row is partitioned via word oriented instructions. This is also later shared with the generated code that will utilize basic-op instructions when extracting fields from the row. The algorithm for determining which database page (CI) and row to extract was also rewritten for the new subroutine using the most efficient instructions available.

Figure 3B:
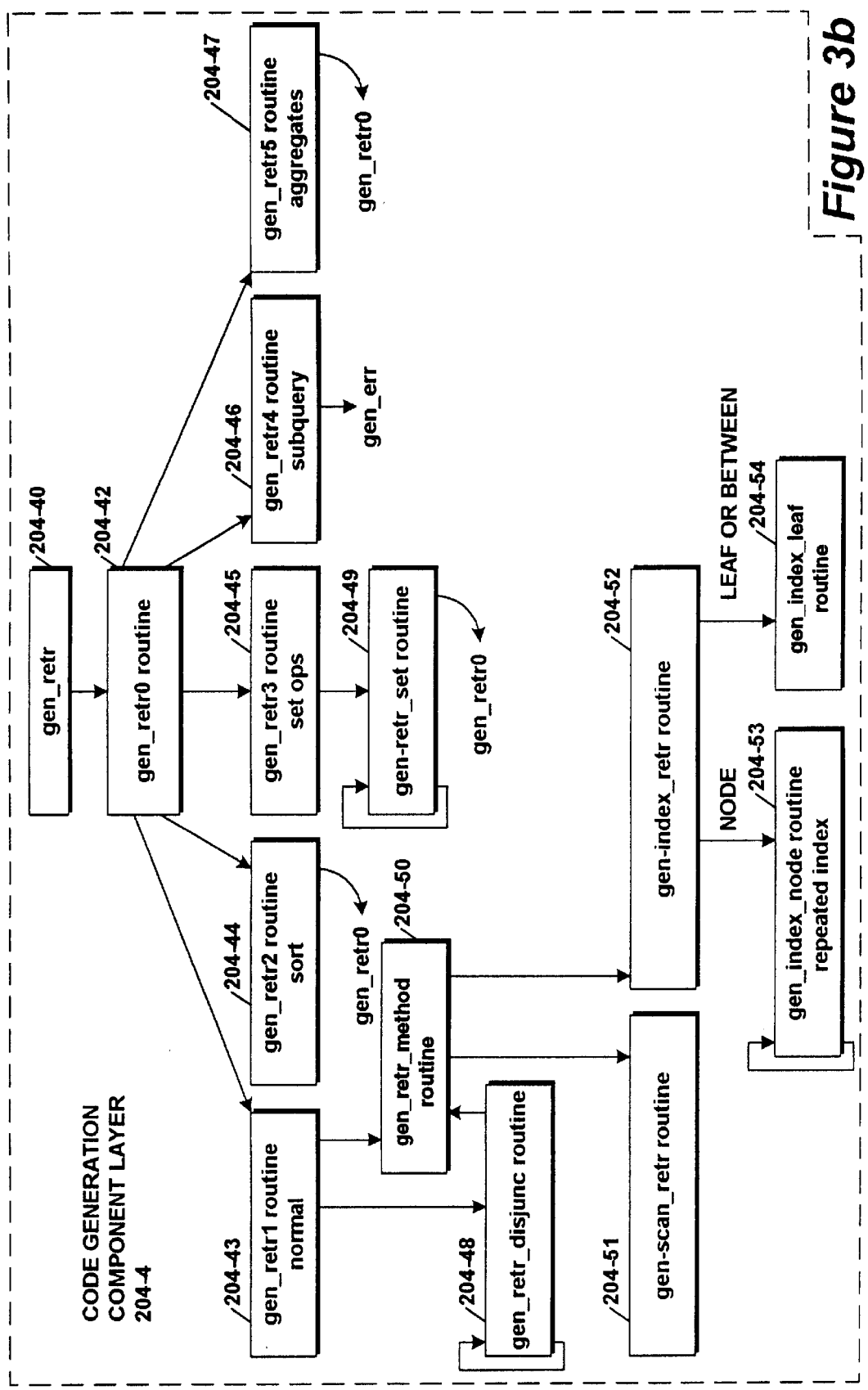
FIG. 3b is a block diagram illustrating in greater detail, the code generation component of FIG. 3a used in conjunction with the present invention.

Component 204-4 Code Generation Routines—FIG. 3b

FIG. 3b illustrates in greater detail, the structure of a portion of component 204-4 according to the present invention. More specifically, FIG. 3b depicts the routines that generate the code to perform index or data file retrievals. These routines include a number of standard routines that correspond to blocks 204-40 through 204-49 and 204-53. Additionally, the routines gen_retr_method function 204-50 and gen_index_leaf 204-54 have been extended. The routine gen_retr_method in accordance with the present invention generates the code to call the new high speed subroutine for enhancing data row retrieval performance. It also controls the generation of the basic-op intense code that extracts the specific fields, or columns, from the rows that are retrieved. Since this code is query specific, it is optimized for the specific SQL request. The routine 204-50 incorporates into the code, any information that is necessary for carrying out the functions of the bypassed lower layer RFM manager component 206.

The routine gen_index_leaf 204-54 determines whether to produce code that calls a different performance enhancing routine for executing indexing operations and is utilized by the invention disclosed in the last cited related patent application.

FIG. 3c

Figure 3C:
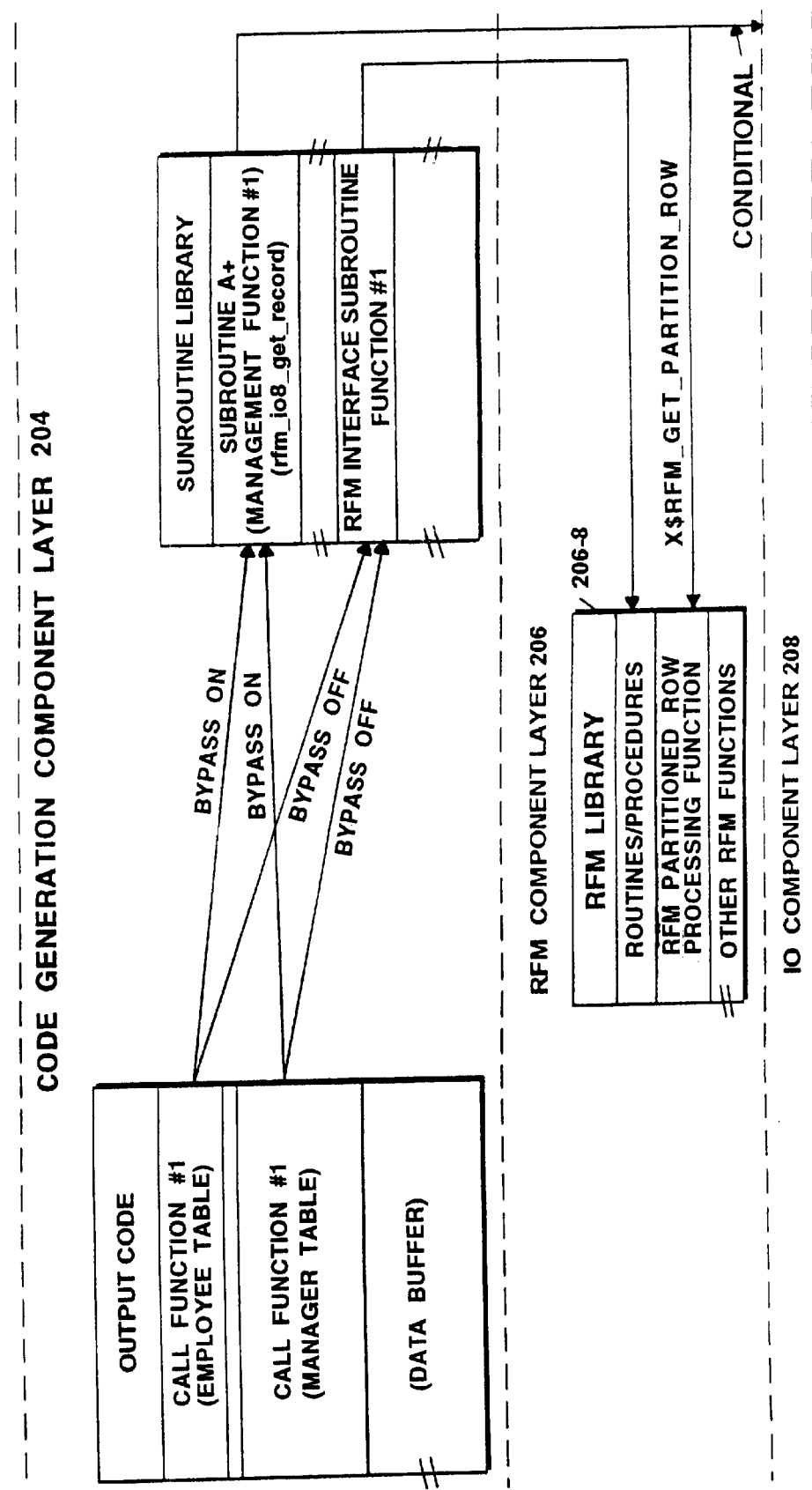
FIG. 3c illustrates the operational relationships between the different layers of the RDMS of FIG. 2.

FIG. 3c illustrates conceptually, the layered organization utilized by the present invention and more particularly, the organization of the code generation component layer 204 when having processed a particular SQL query. For example, FIG. 3b illustrates the case where layer 204 includes the routine for enhancing row retrieval performance that corresponds to subroutine A+ that is prestored in subroutine library 204-8 for implementing the row retrieval record management function #1. This function is designated as subroutine rfm_io8_get_record in FIG. 3c. Also, as indicated in FIG. 3c, library 204-8 further includes the normal RFM interface subroutine for carrying out row retrieval function #1 in the conventional manner by use of the lower RFM component layer 206 routines/procedures stored in RFM library 206-8.

During the processing of an SQL query, the code generation component layer 204 operates to generate code that includes specific call functions to either performance enhancing subroutine A+ or to the standard RFM interface subroutine. The pairs of dotted lines labeled "bypass" and "no bypass" between the output code block and subroutine library 204-8 indicates this in FIG. 3c. More specifically, in FIG. 3c, it is assumed by way of example that the SQL query is generated for obtaining employee information for different employees requiring access to an employee table and a manager table. According to the present invention, layer 204 generates code via routine gen_retr_method 204-50 of FIG. 3b that includes calls to subroutine A+ in the output code as indicated in FIG. 3c.

During the execution of the generated code, the subroutine A+ when called makes a determination based on the characteristics of the data row being accessed by the query. As discussed herein, subroutine A+ makes this determination by examining the record header information. If the row is of a predetermined type that can be readily processed more efficiently, then subroutine A+ performs the required record management operations by calling IO component layer 208 as indicated in FIG. 3b. This effectively bypasses the RFM component layer 206 resulting in increased performance.

When subroutine A+ determines that the row from which data is being accessed is partitioned, then subroutine A+ calls the appropriate procedure within RFM library 206-8 for accessing the particular data row. The run time decision relative to the row characteristic determination is made on the first call to IO component layer 208 (i.e., on the first call to the IO random controller of FIG. 2). The referenced RFM library procedure operates to retrieve all the pieces, concatenates them together and then returns to subroutine A+. Subroutine A+ passes a pointer to the concatenated row back to the generated output code for retrieval of the desired columns.

DESCRIPTION OF OPERATION

With reference to FIGS. 1 through 3c, the operation of the preferred embodiment of the present invention will now be described in greater detail with reference to the flow chart of FIG. 4.

As discussed above, the present invention enables the removal of the RFM lower component layer 206 to speed up row retrieval processing. It was determined that the performance of row retrieval processing involving non-partitioned rows could be substantially enhanced. Since most retrieval processing involves non-partitioned rows, the overall performance of the data manager can be increased utilizing the present invention.

It is helpful to discuss the manner in which rows are inserted into the database. Initially, rows are always inserted into the database in an nonpartitioned/unpartitioned manner. That is, the RFM component layer 206 enforces a rule that initially, the row must completely fit within the target page (i.e., CI). If the row does not fit into a given CI, a page is found that contains enough unused space to accommodate the row. Rows become partitioned when updates occur. For example, assume that a row was inserted into the database page that took up 200 bytes of storage and left 20 bytes of space remaining in the page. If an update occurs that changes a column that had used no bytes of space (i.e., it was NULL) to using 50 bytes of space, then the row no longer fits in the page or CI (i.e., the page is 30 bytes too small). When this occurs, the RFM component layer 206 will transfer a subset of the row into another page. This results in the data row being split over two pages or CIs. This process can continue so that theoretically, different parts of the row exist in many pages.

Prior Sequence of Events for Selecting Row Data

Before discussing the operation of the present invention, it may be helpful to discuss the way in which the data manager previously performed row retrieval operations. Such operations are generally performed in response to an SQL SELECT statement. By way of example, it will be assumed that the COBOL application program 201-1 of FIG. 3a is being executed and the program requests data via a SELECT statement. Further, it is assumed that code has already been generated by the code generation component 204-4 for the particular query.

In response to the query, the SQL adapter 201-2 calls the SQL director 202 passing to it, an SQLCA structure describing the query and an SQLDA structure describing to where the data should be returned. These structures are discussed in the publication entitled "COBOL-85 Structured Query Language User's Guide", copyright 1986,1995 by Bull HN Information Systems Inc. order no. EC50. The SQL director calls the output code generated to execute the particular query (Output Code).

The Output Code segment includes a data buffer to temporarily retain the data and also generates an RFM_XPT structure that defines the request and includes a pointer to the data buffer. Also, the Output Code passes information to the RFM component layer 206 that describes the individual fields to retrieve. This information includes offset and length information in a structure called the field_descriptor, which is a member or subset of the RFM_XPT structure. Next, the Output Code calls its subroutine library 204-8 which then calls RFM component layer 206 passing to it, the RFM_XPT structure. The RFM component layer analyses the request and then calls the IO component layer 208.

Most queries utilize index access. The result of an index access is an index search that results in a database key value (DBKEY) that indicates where the desired data row is stored (i.e., its page or CI number and associated line array offset). Thus, normally, the Output Code will have passed a DBKEY to the RFM component layer 206 via the RFM_XPT structure that contains information relating to where the desired row is stored in the data file. The RFM component layer 206 calculates the CI number (i.e., the data file page number) from the DBKEY, writes it into an IO_XPT structure and then calls the IO component layer 208 to retrieve the page (CI).

Next, the IO component layer 208 calls the buffer manager 210 of FIG. 2 to acquire the page (CI). Buffer manager 210 acquires the CI either via a physical I/O operation or from an in-use buffer and returns to layer 208. IO component layer 208 sets a pointer value to the page (CI) in the IO_XPT structure and returns to the RFM component layer 206. The RFM component layer 206 calculates the line array offset value from the DBKEY and then copies the data from the page (CI) into the Output Code data buffer via the information supplied in the RFM_XPT field descriptor. Next, the RFM component layer 206 returns with status in the RFM_XPT structure. Finally, the supporting subroutine processes the status in the RFM_XPT structure and returns to the calling Output Code.

The Output Code processes the data in its data buffer. For a typical SELECT statement, it copies the data from the data buffer to the user's program via pointers supplied via the SQLDA structure. Then, the Output Code returns to the SQL Director 202 and the Director 202 returns to the user.

Present Invention Sequence of Events for Selecting Row Data

The present invention joins the Code Generation component's 204-4 knowledge of the data and the locations of its data buffer and indicator variables with the RFM component layer's 206 knowledge of the physical layout of the data on the page (CI). This results in a combination of query specific Output Code and the performance enhanced subroutine that processes the data contained in the page (CI) remarkably faster than the above described sequence for selecting data.

Figure 4:
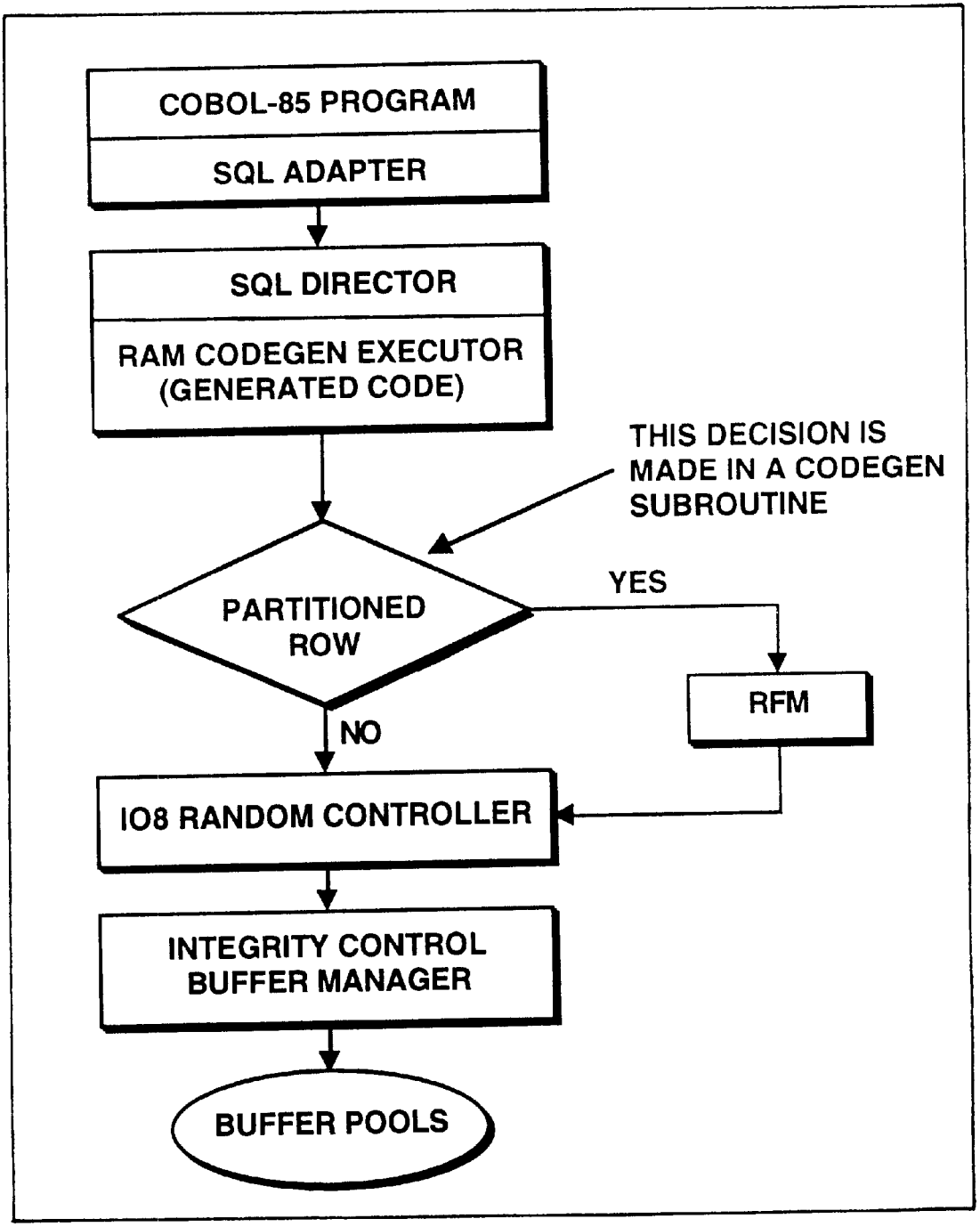
FIG. 4 is a flow diagram used to describe the operation of the present invention.

The resulting new sequence for selecting data is illustrated in FIG. 4. When the COBOL application program 201-1 of FIG. 3a requests data via a SELECT statement, the processing is unchanged from the prior sequence until the Output Code is executed. Instead of calling the RFM component layer 206, unconditionally, the Output Code calls the optimized library subroutine A+ contained in subroutine library 204-8 which calculates the page (CI) from the DBKEY and writes the result into an IO_XPT structure and then calls the IO component layer 208, passing to it, the IO_XPT structure. The IO component layer 208 calls the buffer manager 210 and acquires the page (CI). The IO component layer 208 returns with a pointer to the page (CI). Also, the IO component layer 208 returns the pointer in the IO_XPT structure to the Output Code.

Next, the optimized library subroutine A+ calculates the line number from the DBKEY, copies the record header using a string copy instruction into a word aligned buffer in the Output Code's data section and analyzes the data record header using basic-op instructions for determining whether or not the data record is partitioned. If the data record is not partitioned, then the optimized subroutine A+ returns to the Output Code. In the preferred embodiment, the Output Code includes highly efficient instructions that were produced by the code generation component 204-4 to obtain the most efficient column processing code possible. This code uses information in the word aligned_record header to identify the offset and length of the required columns in the row. It then copies the required columns from the page (CI) to its data buffer._This completes the data retrieval phase. If the data needs to be processed (e.g., summed) then code will have been generated to handle that task. Once additional processing is complete, the Output Code copies the results from its data buffer to the caller via descriptors in the SQLDA and returns to the SQL Director 202.

If the record was partitioned (i.e., not contiguously stored in the page (CI)), then the optimized subroutine A+ would call the RFM component layer 206 to process the request, passing to it, the RFM_XPT structure that includes the DBKEY for the required data record. The RFM component layer 206 is designed to include a new entry point X$RFM_GET_PARTITION_ROW, indicated in FIG. 3c, that was added for the optimized subroutine A+ to call. This entry point is an interface into the RFM component layer 206 partitioned row processing that performs all of the necessary page (CI) reads (i.e., IO calls) and concatenates the data row partitions in a RFM data buffer.

The optimized subroutine A+ does not have to call the RFM component layer's code for moving the concatenated row to the Output Code data buffer. Instead, the RFM component layer 206 returns to the optimized subroutine A+ with a pointer to the RFM component layer's data buffer passed back in the RFM_XPT structure. From this point to completion, the processing is identical to that just described in regards to unpartitioned data records. The Output Code then copies the required columns from the RFM component layer's 206 data buffer into its own data buffer and performs any other required processing. Next, the Output Code returns to the SQL Director 202 that will then return to the user.

From the above, it is seen that by including the CI layout knowledge within subroutine A+ of FIG. 3c, this routine can "find" the right row from the DBKEY, pass a pointer value to it for the Output Code to process and copy the row's data record header into a fixed location in the Output Code's data space in memory. This information is word aligned in memory so that the efficient word and half-word oriented instructions included within the row retrieval performance enhancing subroutine can to be used to process the data fields of the data record header as efficiently as possible. The Output Code only needs to know where the row is located in the page organization used (CI).

The code generation component layer 204 has built into it knowledge of the RFM data row header format (i.e., contained within the gen_retr_method routine 204-50 of FIG. 3b). Since every RFM row includes a data record header that includes a bit pattern indicating the storage characteristics of the record (e.g. partitioned or unpartitioned row), the subroutine A+ is able to determine if the data row being retrieved is the type of row whose row retrieval processing can be substantially enhanced.

The above has illustrated how the present invention enhances row retrieval processing by including a row retrieval subroutine designed to efficiently process row data that includes the required functionality to perform the record management functions performed by a lower component layer.

The appendices illustrate examples of output code utilized in the preferred embodiment of the present invention. Also, the appendices include snippets of the code involved has been included in the Appendix. More specifically, Appendix IV includes the snippets of the code that is used in the generation of the call to the optimized subroutine. Also, Appendix V includes some of the significant code that is incorporated in the RFM Bypass logic subroutine utilized by the present invention. This code illustrates the interface with IO8 and RFM. Finally, in Appendix II, a sample output from the code generator has been included. This illustrates the code that makes the call to the RFM Bypass subroutine and the code that extracts the columns within the retrieved row and moves them into the data section's data buffer.

From the above, it is seen how the control mechanism of the present invention improves system performance. It will be appreciated that many changes may be made to the preferred embodiment of the present invention without departing from its teachings. For example, the present invention may be used in different types of data processing systems and in processing different types of queries. For example, while the present invention was described relative to processing SQL statements, it will be obvious to those skilled in the art that the present invention may be used in conjunction with other languages, code, etc.

Further, the present-invention could be used by any database-oriented system that seeks to make significant performance gains. This could include all database types, not only relational database systems, including "home brew" (i.e., home developed) flat file databases that are used by many application developers.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

Express Mail Label No.
US EL200037261
52-3173

APPENDICIES

I. Glossary
II. Code Generated at Execution Time to Optimize Data Row Retrieval
III. Optimizer Output-EDOT Example
IV. Code Snippets Utilized by Code Generation Component to Generate the Call to Retrieve a Row
V. Code From Subroutine A+

Ex___ss Mail Label No.
US EL200037261
52-3173

APPENDIX I

Glossary

- access method — The way in which the RDBMS accesses relational data, using hash, indexed, or scan access.
- access plan- — The RDBMS Optimizer's plan for executing an SQL statement, including the type of access to each table, order of access, whether any sorts or joins are performed, and related information.
- administrator- — An individual who carries out tasks such as creating databases and/or monitoring the use and performance of those databases.
- application- — A program or set of programs that performs a specific task, such as entering orders and updating inventory records.
- application programmer (application developer)- An individual who participates in the design, implementation, and/or testing of applications, including end-user facilities.
- attribute- — A descriptive characteristic of an entity, such as name, order number, item quantity, and so on. A characteristic such as UNIQUE or NOT NULL that can be applied to a column or other entity.
- Buffer Manager- — The software that manages buffer pools.
- buffer pool- — Main memory that is reserved for the buffering requirements of one or more tablespaces, tables, or indexes.
- Central SQL Cache- — Configured memory space in which code segments generated by the RDBMS are stored for reuse if the same SQL statement is executed again by any process that has been associated with this same Express Mail Label No.
US EL200037261
52-3173
-20-

| | |
|---|---|
| • CHARACTER data type- | An RDBMS data type defined as fixed-length character. |
| • code generation- | The RDBMS process that generates executable code for a specific SQL statement instead of executing that statement interpretively. |
| • code segment- | The code generated by the RDBMS for a specific SQL statement. Each code segment is stored in the Cache for reuse if the same SQL statement is executed again by the same process in the case of Process-Local SQL Cache, or by another process in the case of Central Cache. |
| • code_token (node) | An item that uniquely refers to a segment of generated code. |
| • column- | The vertical component of a table. A column contains information about one of the attributes of an entity. The relational equivalent of a field. |
| • concurrency control- | The management of file accesses by processes operating concurrently, with the goal of ensuring that no process interferes with any other process and that the integrity of the data accessed in common is maintained. |
| • concurrency level- | The number of processes that concurrently access the same data. |
| • concurrent access- | Two or more processes accessing the same data table or partition at the same time. |

Preceding text: Central SQL Cache. The use of one or more Central SQL Caches is optional and under Administrator control.

Express Mail Label No.
US EL200037261
52-3173

- Control Interval (CI)- The physical space increment used to store data in RDBMS files, processed as a unit. Synonymous with page. In a hash table, a CI is called a hash bucket.
- data type- A definition of how the data in a column is stored and managed. Commonly used data types include CHARACTER, NUMERIC, and FLOAT.
- database- A collection of data that has meaning to an organization or to an individual and that is managed as a unit.
- database key (DBKEY) A database key is a key that consists of the CI number and line array for a row. When a row is inserted into a table in an INTEREL / RFM database, RFM assigns a DBKEY to the row's index entry. This DBKEY is appended to the index entry so that when the entry is found later by a search, the DBKEY is then used to locate the data row.
- Database Management System (DBMS)- A set of software that controls the creation, organization, and modification of one or more databases, and provides access to the stored data.
- Data Definition Language (DDL)- Statements used to define the entities, attributes, and relationships that make up a database. DDL statements in RDBMS include CREATE MODEL, CREATE TABLE, CREATE INDEX, and others.
- Data Manipulation Language (DML)- Statements used to access data and potentially to change data content. DML statements in RDBMS include SELECT and UPDATE.

- DATE data type- A special-purpose RDBMS data type used to store a four-byte date that can be used in comparisons or computations. The date is formatted in packed decimal in the row in storage, and expanded when read into application memory.
- DECIMAL data type- An RDBMS data type defined as fixed-length with decimal content.
- EDOT A set of structures resulting from the processing of a query by an optimizer. The term EDOT pertains to the identification (name) of the file code where these structures were once stored (i.e. the E. file code file).
- FROM clause- The part of an SQL statement that specifies the table(s) from which data is to be accessed.
- generated code- A reusable set of machine instructions that are produced to execute a particular SQL statement.
- gen_time (node) The approximate time that was required to generate the associated segment of code.
- host variable- Storage allocated by a language processor such as COBOL-85 for use in passing variable information to or from an SQL statement.
- host-relational files- Files managed by RAM/RFM and maintained on mass-storage devices attached to a system. The term is used to distinguish these files from relational files maintained by a Relational Data Base Computer linked to a system.
- IO_XPT This structure is the parameter passed on every call to the IO Component Layer. When performing a SELECT or FETCH, the file identifier and CI number are passed in this structure. The results of IO Express Mail Label No.
US EL200037261
52-3173

- index- A set of pointers to data in relational tables, used to improve the speed of access to the data. The index is maintained in the form of a balanced B-tree structure.
- index key- The column(s) whose values are included in the index for the table.
- indexed access- The access mode in which RDBMS uses one or more indexes to retrieve the requested information. In some cases, RDBMS can retrieve the requested information directly from the index, without accessing the data table.
- indicator variable- An indicator used to notify the application that an exception condition, such as an overflow or truncation error, occurred. When used to indicate the presence of the null value, the indicator is referred to as a null indicator variable.
- indicator column- A technique in denormalization in which an indicator column in one table indicates whether an access to a second table is required. Using an indicator column introduces the risk that data anomalies will occur.
- INTEGER data type- An RDBMS data type used to store binary values.
- integrity- The property of being logically correct and consistent. In some cases, this term also implies denying access to unauthorized users and processes.
- null value- A value designed to be used when the actual value is unknown or inappropriate. For example, using the null value for a price that has not yet been defined Component Layer operations are returned in this structure.

| | | |
|---|---|---|
| | | avoids the ambiguity of using a zero value in this case. |
| | null indicator variable- | An indicator used to notify the application that a column contains the null value. |
| | NUMERIC data type- | An RDBMS data type defined as fixed-length and limited to the numerals 0-9. |
| | Operational Directory Interface (ODI)- | A data definition directory used by RDBMS. |
| | Optimizer- | The software component of RDBMS that analyzes each SQL statement and defines the access plan that will produce the optimum performance for the execution of that statement. |
| | page- | The physical space increment used to store data in RDBMS files, processed as a unit. Synonymous with control interval (CI). |
| | partitioned row | A row that was originally inserted into a database page and was subsequently updated so that the row exists in more than a single page or CI. |
| | partitioned tablespace- | A tablespace that contains a single table that is too large to process efficiently as one entity. The tablespace and the table are separated into partitions that can be placed on different mass storage devices. Each partition can be processed independently. |
| | performance- | The ability of applications and interactive facilities to meet users' requirements for speed of response in interactive applications or speed of throughput in production batch and/or transaction processing applications. |

Express Mail Label No.
US EL200037261
52-3173

- primary index (key)- In some implementations, but not in RDBMS, an index (and associated key) that uniquely identifies each row of a table.
- process- An execution unit, which may or may not be identical to an application program. (An application program may involve multiple processes.)
- Process-Local SQL Cache- The configured memory space in which code segments generated by RDBMS are stored for reuse if the same SQL statement is executed again by the same process.
- query- Used to refer to any SQL statement that causes an access to relational tables, regardless of whether the access is followed by a modification.
- read-ahead feature- The Buffer Manager's operational mode in which up to 16 pages are read into the buffer pool at one time, so that the data will be available when needed. The read-ahead feature is used in scan access mode.
- recovery- The process of restoring database(s) and/or application(s) to a known state after an exception condition or a process or system failure.
- Relational Access Manager (RAM)- The part of the RDBMS software that manages relational tables.
- Relational database- A database that is defined in terms of entities, attributes, and relationships, and that observes the concepts defined originally by E.F. Codd.
- Relational Database Management System (RDBMS)- The INTEREL Software that manages relational databases.

- Relational File Manager (RFM)- The part of the RDBMS software that accesses data from relational files, as directed by the Relational Access Manager (RAM).
- RFM_XPT The RFM_XPT structure is the parameter that must be passed on all calls to RFM functions. It facilitates the passing of variable information to the RFM component layer regarding the operation to be performed in a subset of the structure named the V block. It also facilitates the return of information such as DBKEY and status in another subset of the structure named the R block. When generated code's subroutines call the RFM component layer to retrieve a row, the subroutines pass the DBKEY, file identifier and description of what columns to fetch and where to store them (that is a pointer to the generated code's data buffer) in the RFM_XPT structure. The subroutines also examine the RFM_XPT's R block after the call to determine the status of the request.
- relationship- An association of one or more entity types with one or more other entity types.
- row- The horizontal component of a table. A row consists of a sequence of values, one for each column of the table.
- scan access- The access mode in which RDBMS scans a table sequentially, row-by-row, to retrieve the requested information.

Express Mail Label No.
US EL200037261
52-3173

-27-

- search condition- The specification of how to identify the desired data in the rows and columns retrieved when processing an SQL statement.
- secondary index- In some RDMBS implementations, any index that is not a primary index. In RDBMS, most indexes are treated as secondary indexes; cluster indexes and system-generated indexes created because a column is defined with the UNIQUE attribute are the exceptions to this rule. RDBMS enforces the uniqueness of the columns included in these indexes.
- SELECT- An SQL statement that defines the information to be selected from one or more tables. Also, a clause that includes the SELECT verb in an SQL statement.
- single-column index (key)- An index and key made up of only one column.
- single-table tablespace- An unpartitioned tablespace that contains one table. The tablespace is a single physical file. Contrast this with multi-table tablespace and with partitioned tablespace.
- SMALLINT data type- An RDBMS data type used to store binary values, using less space than is required for the INTEGER data type.
- SQL- Originally an acronym for Structured Query Language. Now the name of the language most commonly used to access relational databases.
- SQL Cache- Configured memory space in which code segments generated by RDBMS are stored for reuse if the same SQL statement is executed again. There are two levels of SQL Cache, Process-Local SQL Cache and Central SQL Cache.

Express Mail Label No.
US EL200037261
52-3173

-28-

- SQLCA         The SQL Communication Area (SQLCA) is a fixed-length data structure which allows the application program to provide the specific database options and information to the database content manager. It also allows the application program to interrogate the execution results of an embedded SQL statement.

- SQLDA         The SQL Descriptor Area (SQLDA) is a variable length data structure that when used in an OPEN or FETCH statement, it provides the information about the host variables to INTEREL software.

- table-        The relational component that corresponds to a file in non-relational technology. Tables have two forms: hash and non-hash.

- tablespace-   Physical space that is created explicitly to contain one or more tables in a relational database. If a tablespace is not created explicitly, the table is stored in space allocated by the system. Space allocated by the system is not called a tablespace.

- TIME data type-  A special-purpose RDBMS data type used to store a three-byte time that can be used in comparisons or computations. The time is formatted as packed decimal in the row in storage, and expanded when read into application memory.

- TIMESTAMP data type- A special-purpose RDBMS data type used to store a 10-byte time stamp that can be used in comparisons or computations. The timestamp is formatted as packed decimal in the row in storage, and expanded when read into application memory.

Express Mail Label No.
US EL200037261
52-3173

-29-

- Transaction Processing Routine (TPR)- An application program that processes transactions under control of a transaction monitor. In the context of this publication, the transaction monitor is TP8.
- tuning- The process of adjusting database definitions, application implementations, and/or system parameters to improve performance.
- UNIQUE key- An index key or a hash key made up of one or more columns in which no duplicate values are allowed.
- unpartitioned tablespace- A tablespace that contains either a single table or multiple tables. The latter case is called a multi-table tablespace. In both cases, the tablespace is a single physical file. Contrast this with partitioned tablespace.
- user- An individual who accesses RDBMS databases by means of an application or interactive facility.
- VARCHAR data type- An RDBMS data type defined as variable-length character.
- WHERE clause- The part of an SQL statement that defines the conditions (restrictions) for selecting data before grouping (if grouping is specified). These restrictions are referred to as search conditions.

Express Mail Label No.
US EL200037261
52-3173

-30-

APPENDIX II

1. Code Generated at Execution Time to Optimize Data Row Retrieval

The following code was generated by the code generator to handle the data row retrieval task for the query:

```
SELECT playerNum , lastName , school FROM cards98 WHERE playerNum = " 31 "

* Initialize the RFM_XPT structure
000350 001274450000  STZ 01274
000351 001275450000  STZ 01275
000352 001276450000  STZ 01276
000353 001277450000  STZ 01277
000354 006000236007  LDQ 06000,DL
000355 001316756000  STQ 01316
000356 001317756000  STQ 01317
000357 000726236000  LDQ 0726 RFM Schema Pointer
000360 001220756000  STQ 01220
*****************************************
* Get row from IO8, bypass RFM
*****************************************
000361 000726236000  LDQ 0726 RFM Schema Pointer
000362 001330756000  STQ 01330
000363 000730236000  LDQ 0730 Data Base Key
000364 001331756000  STQ 01331
000365 000734236000  LDQ 0734 RFM RAP Number
000366 001332756000  STQ 01332
000367 001330635400  EPPR5 01330
000370 000002630404  EPPR0 02,IC
000371 345546710100  TRA RFM_IO8_GET_RECORD-BIAS,,P3
000372 343662710100  TRA RAM_RFM_ERROR-BIAS,,P3
* Copy columns from IO8 to record buffer
* Copy a column and set its indicator variable
000373 000765450000  STZ 0765
000374 001321727000  LXL7 01321 Offset  (via data record header)
000375 001322221000  LDX1 01322 Length  (via data record header)
000376 000004601004  TNZ 04,IC
000377 000001336007  LCQ 01,DL          zero length = NULL
000400 000765756000  STQ 0765
000401 000006710004  TRA 06,IC
000402 000000226003  LDX6 00,DU Offset (into the code's data space)
000403 000004220003  LDX0 04,DU Length (max length of column)
000404 040056100557  MLR (AR,RL,,x7),(,RL,,x6)  copy the column
000405 700006400011  ADSC9 06,2,x1,P7
000406 000742000010  ADSC9 0742,0,x0
* Copy a column and set its indicator variable
000407 000767450000  STZ 0767
000410 001323727000  LXL7 01323 Offset  (via data record header)
000411 001324221000  LDX1 01324 Length  (via data record header)
000412 000004601004  TNZ 04,IC
000413 000001336007  LCQ 01,DL          zero length = NULL
000414 000767756000  STQ 0767
000415 000006710004  TRA 06,IC
000416 000023226003  LDX6 023,DU Offset (into the code's data space)
000417 000014220003  LDX0 014,DU Length (max length of column)
000420 040056100557  MLR (AR,RL,,x7),(,RL,,x6)  copy the column
000421 700006400011  ADSC9 06,2,x1,P7
000422 000742000010  ADSC9 0742,0,x0
```

Express Mail Label No.
US EL200037261
52-3173

-31-

```
* Copy a column and set its indicator variable
000423 000766450000 STZ 0766
000424 001322727000 LXL7 01322 Offset  (via data record header)
000425 001323221000 LDX1 01323 Length  (via data record header)
000426 000004601004 TNZ 04,IC
000427 000001336007 LCQ 01,DL        zero length = NULL
000430 000766756000 STQ 0766
000431 000006710004 TRA 06,IC
000432 000004226003 LDX6 04,DU Offset (into the code's data space)
000433 000017220003 LDX0 017,DU Length (max length of column)
000434 040056100557 MLR (AR,RL,,x7),(,RL,,x6)  copy the column
000435 700006400011 ADSC9 06,2,x1,P7
000436 000742000010 ADSC9 0742,0,x0
```

RFM_IO8_GET_RECORD is the runtime codegen support subroutine that receives as input the DBKEY, calls IO8 and returns with the data buffer header moved into the generated code's data space. It also returns with pointer register P7 pointing to the data row in the IO8 buffer. So, the generated code has the data space offsets to the record header "baked in" at generation time that makes acquisition of this information extremely fast.

Express Mail Label No.
US EL200037261
52-3173
-32-
APPENDIX III.
1. Optimizer Output-EDOT Example:
For the query:
```
select firstName, ssNumber from student
     where lastName = 'Jones' and middleInitial = 'A';
```
the RAM Optimizer produces the following EDOT:
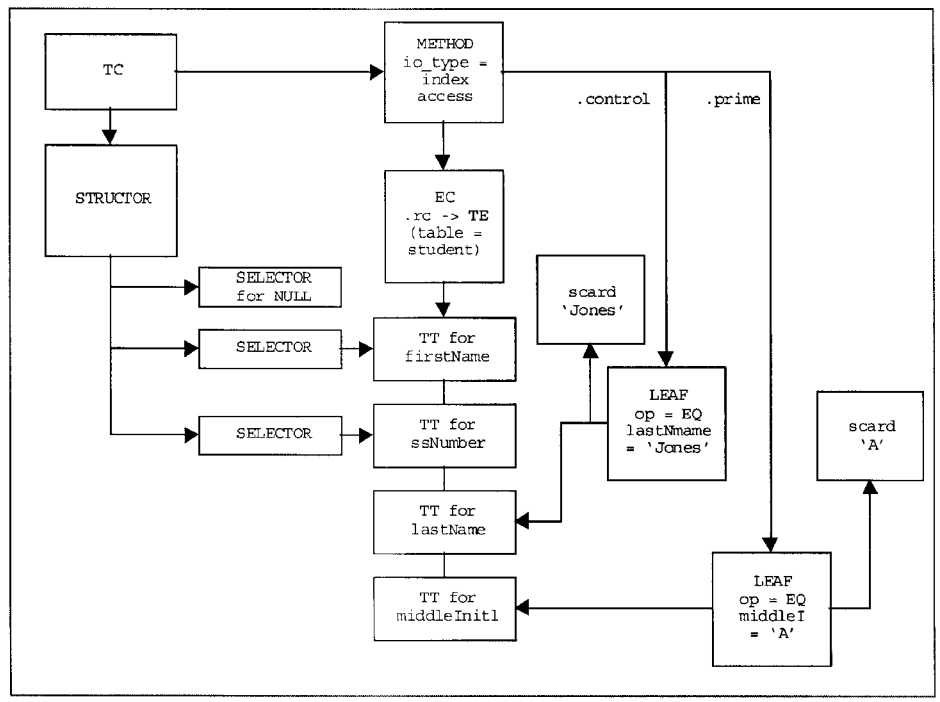

E... .ess Mail Label No.
US EL200037261
52-3173

-33-

APPENDIX IV.

1. Code Snippets Utilized by gen_retr_method for Generating the Call to Retrieve a Row

5  Snippet 1 - gen_retr_method
```
if (bypassRFM)
    sts = genGetRowDirect(rec);   << generates the new call and
else                                 supporting logic.
    sts = gen_rfm_getRow(rec, fldlst); << generates the old call
10                                         and supporting logic.
```

Snippet 2 - genGetRowDirect function subset
Note: Input parameter rec is a structure that contains all the
15 information required to retrieve the row including a pointer to
where the DBKEY resides in the data section for the code burst.

```
    int     genGetRowDirect(rec)
    REC     *rec;                 /* REC for record to get */
20  {
    int     sts;

sts = initRFM_XPT(rec, 0, 0, 0);
    sts = initDataRecHdr(rec);
25  sts = genRFMIO8Call(rec);   << generates the new call.
    sts = genCopyColumns(rec);  << generates code in Appendix II.

return(0);
    }
30
```

Snippet 3 - genRFMIO8Call
Note: This uses the putcode macro to write the argument to the code
segment. The macro increments the instruction counter by one for
every insert. The second argument to the putcode macro is one that
35 dictates whether the address field of the instruction must be relocated when the code is placed into execution. Typically, references to the data section require relocation and others don't.

```
     /* call 'afhgrfmi' to do the function    */
 5   if((sts = putcode((parofs << 16) | 0635400, RELOC_CS)) < 0)
         return (sts);                          /* EPPR5 params      */
     if((sts = putcode(0000002630404, RELOC_NONE)) < 0)
         return (sts);                          /* EPPR0 *+2         */
     calofs = ptr_to_long((void *) rfm_io8_get_record);  << link to new subroutine.
10   calofs -= BIAS;
     calofs &= 0077777000000;
     if((sts = putcode(calofs | 0300000710100, RELOC_NONE)) < 0)  << insert call in code
         return (sts);                          /* TRA    rfm8gr,,p3 */
     calofs = ptr_to_long((void *) ram_rfm_error);
15   calofs -= BIAS;
     calofs &= 0077777000000;
     if((sts = putcode(calofs | 0300000710100, RELOC_NONE)) < 0)
         return (sts);                          /* TRA rfm_err,,p3   */
     return(0);
```

Express Mail Label No.
US EL200037261
52-3173

-35-

APPENDIX V.

2. Significant Code from the rfm_io8_get_record Subroutine A+ code snippet 1 - code that calls IO8 to retrieve the row

```
*                                                                     rfmiwn6m
*       call io8 via io_xpt.enter.read_ci passing io_xpt in the a reg. rfmiwn6m
rfm8c8  null                                                          rfmiwn6m
        lda     filecb,,p7          a = ptr to io_xpt                 rfmiwn6m
        sta     io_ptr-bias,,p4                                       rfmiwn6m
        ldp     p1,readci,,p1       p1 = readci io8 function pointer  rfmiwn6m
        ldx     x0,stfsiz,du        x0 = stack size.                  rfmiwn6m
        eppr0   *+3                 p0 = return.                      rfmiwn6m
        tra     0,,p1               call io8                          rfmiwn6m
        zero    1,0                   passing 1 arg.                  rfmiwn6m
        stq     savq-bias,,p4       save return status.               rfmiwn6m
        qls     0                   if error,                         rfmiwn6m
        tnz     rfm8el                ..then skip..                   rfmiwn6m
*                                                                     rfmiwn6m
*       normal return from io8                                        rfmiwn6m
rfm8rt  null                                                          rfmiwn6m
        ldp     p5,savp5-bias,,p4   restore p5.                       rfmiwn6m
        ldp     p1,io_ptr-bias,,p4  set                               rfmiwn6m
        ldp     p7,ci_ptr,,p1       p7 = ptr to ci header (data_hdr). rfmiwn6m ldx     x0,temp-bias,,p4    x0 = record offset.               rfmiwn6m
        tmi     rfm81d                if neg, line deleted..          rfmiwn6m
        a9bd    0,x0,p7             p7 = ptr to io8 record header.    rfmiwn6m
        lxl     x7,4,,p5            x7 = length of record header.     rfmiwn6m
        ldp     p6,3,,p5            p6 = record buffer in codegen.    rfmiwn6m
        mlr     (ar,rl),(ar,rl)     move                              rfmiwn6m
        adsc9   ci_hdr,,x7,p7         so the record header            rfmiwn6m
        adsc9   0,,x7,p6              is word aligned.                rfmiwn6m
``` code snippet 2 - code that tests for partitioned rows

```
        lda     rechdr,,p6          if                                rfmiwn6m
        ana     rc_sts,du             (ref rfm_retrieve_record)       rfmiwn6m
        cmpa    stdrec,du             not standard record             rfmiwn6m
        tnz     rfm8pr                ..then skip (parititioned)..    rfmiwn6m
```

```
       code snippet 3 - code that calls RFM to process partitioned rows
       rfm8pr null     partitioned row.
 5     *
       *         preconditions:
       *             - the rfm_xpt.schema_ptr$ has been set by the caller.
       *             - the rfm_xpt status fields were initialized by the caller.
       *
10            ldp     p0,5,,p5              p0 = rfm_spt pointer
              lda     rechdr,,p6            reload record type
              arl     12                    set
              ana     =o17,du                 record type
              eax     x7,0,au                 in
15            stx     x7,rfm_rt,,p0           rfm_xpt.
              lda     1,,p5                 set the
              sta     rfm_db,,p0              dbkey to retrieve.
              lxl     x7,2,,p5              x7 = rap number
              sxl     x7,rfm_ra,,p0           set the rap number.
20            stp     p7,rfm_rd,,p0         set ptr to record.
       rfm8cp null
              lda     5,,p5                 a  = ptr to rfm_xpt
              ldp     p1,f_part             p1 = rfm partition function pointer
              ldx     x0,stfsiz,du          x0 = stack size.
25            eppr0   *+3                   p0 = return.
              tra     0,,p1                 call rfm
              zero    1,0                     passing 1 arg.
              stq     savq-bias,,p4         save return status.
              qls     0                     if error,
30            tnz     rfm8ep                  ..then skip..
              ldp     p5,savp5-bias,,p4     restore p5.
              ldp     p0,5,,p5              p0 = rfm_spt pointer
              ldp     p7,rfm_rp,,p0         p7 = rfm ptr to row.
              lxl     x7,4,,p5              x7 = length of record header.
35            ldp     p6,3,,p5              p6 = record buffer in codegen.
       rfm8pm null
              mlr     (ar,rl),(ar,rl)       move
              adsc9   ci_hdr,,x7,p7           so the record header
              adsc9   0,,x7,p6                is word aligned.
40            tra     rfm8xt                goto exit..
```

What is claimed is:

1. A method for enhancing the performance of a data manager that manages a relational database, the manager having a number of operatively coupled component layers for performing functions required for accessing the relational database file records in response to user query statements, the number of component layers including a first component layer for generating output code used in executing the query statement in response to input representing an optimized form of the query statement and a number of lower component layers including at least a second lower component layer for performing predetermined functions required for executing the query statement, the method comprising the steps of:

(a) adding a row retrieval performance enhancing subroutine to a subroutine library included within the first component layer, the row retrieval performance enhancing subroutine being designed to execute a data record management function performed by a lower component layer substantially faster than if the function were executed by the number of lower component layers, and including code for determining conditions under which the particular subroutine is to be invoked during query execution time;

(b) including calls in the generated output code to the row retrieval enhancing subroutine in place of normally included calls to the lower component layer for inserting the row retrieval subroutine into the generated code; and, (c) including logic within the row retrieval enhanced subroutine for determining if the row retrieval enhanced subroutine is to be invoked as a function of a particular characteristic of the type of row data being accessed.

2. The method of claim 1 wherein the particular characteristic of the type of row is whether the row is unpartitioned or partitioned, the row retrieval subroutine being executed to perform the lower layer record management function only when the logic determines that the row data is unpartitioned.

3. The method of claim 1 wherein the first component layer includes a code generation component and the second lower component layer includes a relational file manager (RFM) component having a library for storing a number of routines for performing the lower layer record management functions, the routines including an entry point into an interface into those routines that perform partitioned row processing, the entry point being accessed by the row retrieval subroutine when the logic determines that the row data is partitioned.

4. The method of claim 1 wherein the number of lower component layers further includes a third lower component layer operatively coupled to the first component layer, to the second lower component layer and to the relational database for executing input/output operations required for executing the query statement.

5. The method of claim 1 wherein in step (c), the first component layer invokes the row retrieval performance subroutine to call conditionally, the third lower component layer function based on the storage characteristic of the data record being accessed resulting in increased performance.

6. The method of claim 5 wherein the third lower component layer includes an input/output controller component that operatively couples to the relational database.

7. The method of claim 1 wherein the row retrieval subroutine is coded to include information defining the layout of the page or CI enabling the subroutine to locate the right row from a database key value (DBKEY), to pass a pointer value to the right row for the generated output code and to copy a data record header associated with the row to a fixed location in the memory space being utilized by the generated output code.

8. A data manager for managing a relational database, the manager having a number of operatively coupled component layers for performing functions required for accessing database file records of the relational database in response to user query statements, the number of component layers including a first component layer for generating output code used in executing the query statement in response to input representing an optimized form of the query statement and a number of lower component layers operatively coupled to the first component layer, to each other and to the relational database, the lower component layers including at least a second lower component layer for performing functions required for executing the query statement, the first component layer further including:

(a) a subroutine library including a row retrieval performance enhancing subroutine designed to execute functions performed by a lower component layer substantially faster than if the functions were executed by the lower component layer, the row retrieval subroutine including coded logic for determining conditions under the subroutine is to be executed based on the characteristics of the data being accessed;

(b) the generated output code being stored in memory and including calls to the row retrieval subroutine stored in the subroutine library in place of normally included calls to the lower component layer; and, (c) the generated output code when accessed from memory during execution of the query invoking the row retrieval subroutine to perform the second lower layer functions based on the characteristics of the row data being retrieved resulting in increased performance.

9. The data manager of claim 8 wherein the particular characteristic of the type of row is whether the row is unpartitioned or partitioned, the row retrieval subroutine being executed to perform the lower layer record management function only when the logic determines that the row data is unpartitioned.

10. The data manager of claim 9 wherein the first component layer includes a code generation component and the second lower component layer includes a relational file manager (RFM) component having a library for storing a number of routines for performing the lower layer record management functions, the routines including an entry point into an interface into those routines that perform partitioned row processing, the entry point being accessed by the row retrieval subroutine when the logic determines that the row data is partitioned.

11. The data manager of claim 10 wherein the number of lower component layers further includes a third lower component layer operatively coupled to the first component layer, to the second lower component layer and to the relational database for executing input/output operations required for executing the query statement.

12. The data manager of claim 11 wherein in the first component layer during the execution of the query invokes the row retrieval subroutine to invoke the third lower component layer function when the row data is unpartitioned resulting in increased performance.

13. The data manager of claim 12 wherein the third lower component layer includes an input/output controller component that operatively couples to the relational database.

14. An RDMS program product including a data manager for managing a relational database stored on a media as groups of program instructions, the instructions corresponding to a number of operatively coupled component layers for performing functions required for accessing database file records of the relational database in response to user query statements, the number of component layers including a first component layer for generating code used in executing the query statement in response to input representing an optimized form of the query statement and a number of lower component layers operatively coupled to the first component layer, to each other and to the relational database, the lower component layers including at least a second lower component layer for performing functions required for executing the query statement, the first component layer further including:

(a) a first group of instructions corresponding to a subroutine library that includes a row retrieval performance enhancing subroutine designed to execute functions performed by lower component layers substantially faster than if the functions were executed by the number of lower component layers, the row retrieval performance enhancing subroutine including code containing instructions for determining conditions under which the particular subroutine is to be executed;

(b) a second group of instructions corresponding to a code generation component for providing output code containing calls to the row retrieval performance enhancing subroutine in place of normally included calls to a lower component layer that inserts the row retrieval subroutine into the output code; and, (c) another group of instructions included within the row retrieval subroutine for causing the execution of the row retrieval subroutine to perform the second lower layer functions based on the characteristics of row data being retrieved from the database resulting in increased performance.

15. A memory for storing a data manager for accessing data records of a relational database during the execution of a query, the memory comprising:

(a) first component layer for generating code used in executing the query statement in response to input representing an optimized form of the query statement and a number of lower component layers operatively coupled to the first component layer, to each other and to the relational database, the lower component layers including at least a second lower component layer for performing functions required for executing the query statement, the first component layer contained in the memory further including:

(1) a subroutine library including a row retrieval performance enhancing subroutine designed to execute functions performed by a lower component layer substantially faster than if the functions were executed by the lower component layer, the row retrieval performance enhancing subroutine including code for determining conditions under which the particular subroutine is to be invoked during a row retrieval operation;

(2) generated output code including calls to the row retrieval performance enhancing subroutine in place of normally included calls to the lower component layer for incorporating the row retrieval subroutine from the generated for execution of the query being processed; and, (3) a memory area being assigned for storing the output code and for storing information defining the characteristic of the row data being retrieved, the output code accessed during execution of the query causing the row retrieval subroutine to be executed for performing the second lower layer functions as a function of the row data being retrieved so as to result in increased performance.

* * * * *